United States Patent [19]
Foster

[11] Patent Number: 5,489,018
[45] Date of Patent: Feb. 6, 1996

[54] STEM FOR MOUNTING RECIPROCATING SLAT CONVEYOR

[76] Inventor: Raymond K. Foster, P.O. Box 1, Madras, Oreg. 97741

[21] Appl. No.: 391,587

[22] Filed: Feb. 21, 1995

Related U.S. Application Data

[63] Continuation-in-part of Ser. No. 164,895, Dec. 9, 1993, Pat. No. 5,340,781.

[51] Int. Cl.$^6$ .................................................. B65G 25/00
[52] U.S. Cl. ..................................... 198/750.5; 198/750.2
[58] Field of Search ............................ 198/750.1, 750.2, 198/750.5, 860.1

[56] References Cited

U.S. PATENT DOCUMENTS

| | | | |
|---|---|---|---|
| 4,712,467 | 12/1987 | Foster | 91/176 |
| 4,748,893 | 6/1988 | Foster | 91/176 |
| 4,748,894 | 6/1988 | Foster | 91/176 |
| 4,817,783 | 4/1989 | Foster | 198/750 |
| 4,821,868 | 4/1989 | Foster | 198/750 |
| 4,969,389 | 11/1990 | Foster | 92/66 |
| 5,096,356 | 3/1992 | Foster | 414/325 |
| 5,125,502 | 6/1992 | Foster | 198/750 |
| 5,165,524 | 11/1992 | Foster | 198/750 |
| 5,193,661 | 3/1993 | Foster | 198/750 |
| 5,255,712 | 10/1993 | Foster | 137/522 |
| 5,325,763 | 7/1994 | Foster | 91/422 |
| 5,340,264 | 8/1994 | Quaeck | 198/750.5 |
| 5,350,054 | 9/1994 | Foster | 198/750 |
| 5,353,918 | 10/1994 | Foster | 198/750.5 |

*Primary Examiner*—James R. Bidwell
*Attorney, Agent, or Firm*—Joan H. Pauly

[57] ABSTRACT

A drive frame assembly includes opposite transverse drive frame members (64), each of which includes a metal plate (66) with a central portion having a plurality of longitudinal corrugations (68). The plate (66) is stiffened by transverse beams (78, 80). A plurality of piston-cylinder drive units each have opposite ball ends (24, 26) which are secured to end portions of the corrugations by means of ball blocks (50, 52). Opposite side portions of the plate (66) are secured to laterally spaced portions of a main frame of a structure. The connections are made by a fastener/shim arrangement to accommodate variations in vertical spacing of the drive units relative to the portions of the main frame.

24 Claims, 6 Drawing Sheets

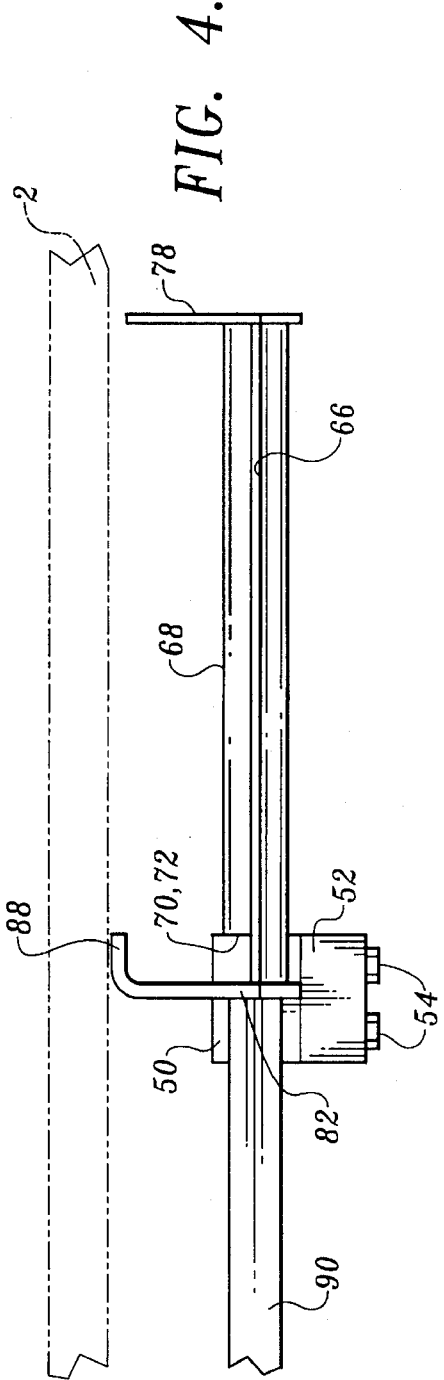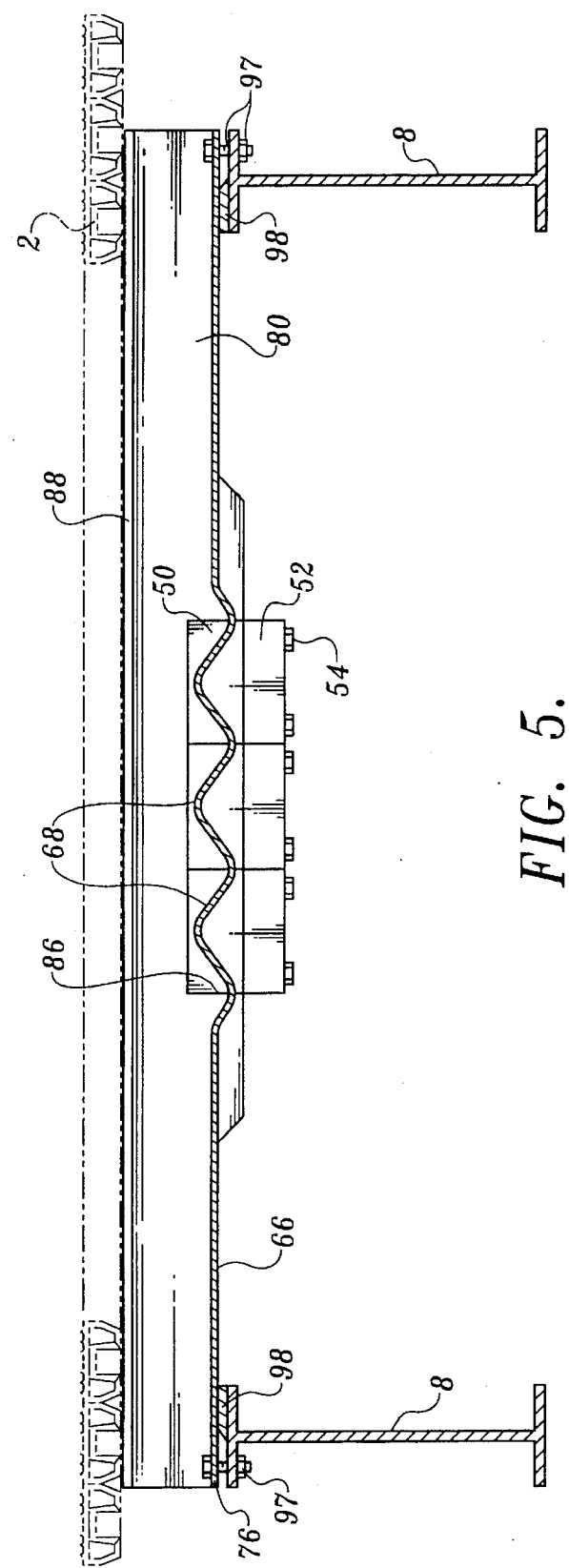

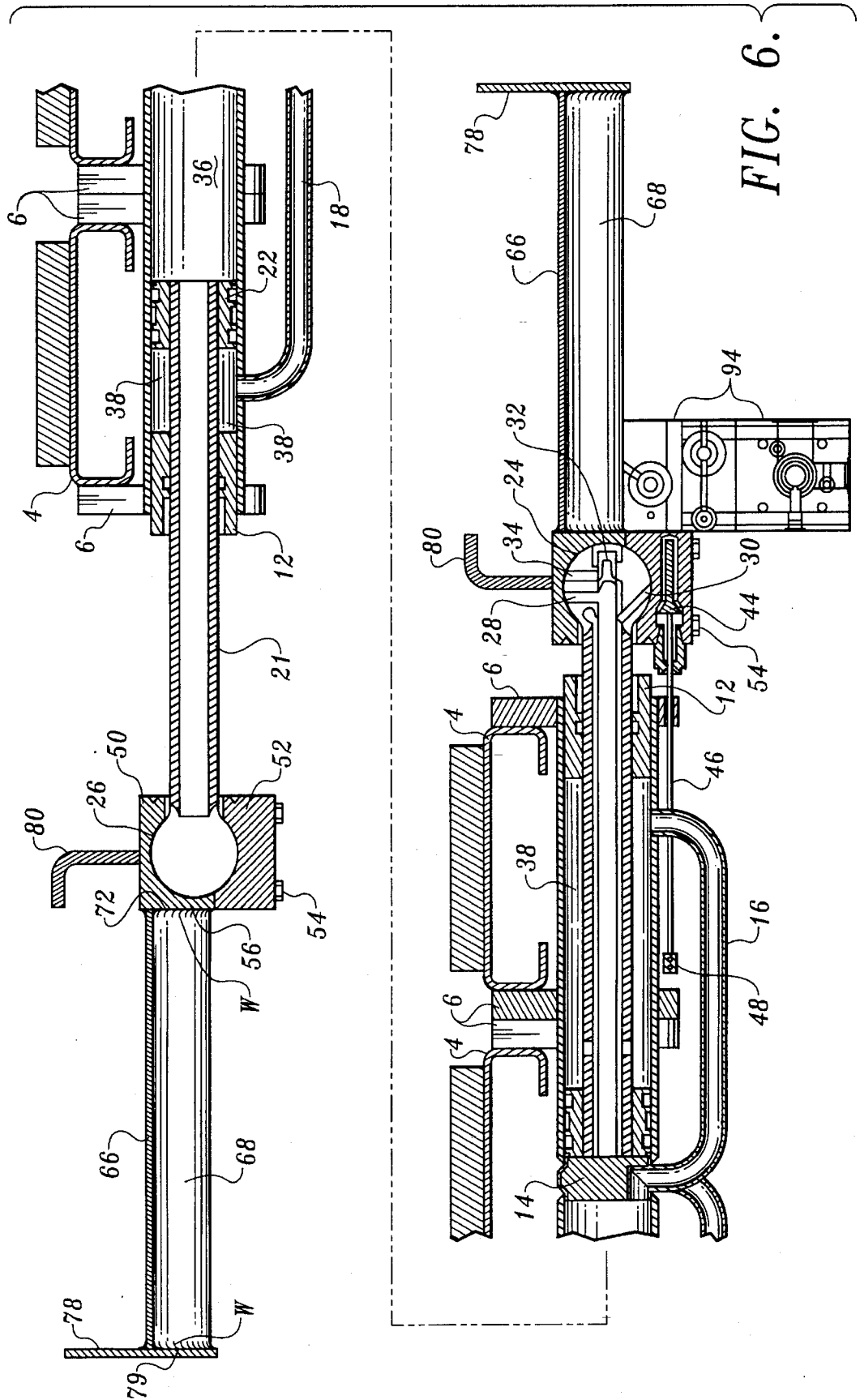

STEM FOR MOUNTING RECIPROCATING SLAT CONVEYOR

RELATED APPLICATION

This application s a continuation-in-part U.S. Ser. No. 08/164,895, filed Dec. 9, 1993, now U.S. Pat. No. 5,390,781 and entitled "Mounting Assembly and Method or Reciprocating Slat Conveyer."

TECHNICAL FIELD

This invention relates to systems for mounting reciprocating slat conveyers and the drive assemblies thereof and, more particularly, to such a system in which a drive frame assembly includes at least one piston/cylinder drive unit and a stiffened transverse drive frame member, and the transverse drive frame member is secured to a main frame of a structure by fasteners and shims, to compensate for variations in vertical spacing of the drive unit relative to the main frame.

BACKGROUND INFORMATION

Reciprocating slat conveyers are used in various types of installations and may be mounted on different kinds of structures. One example of a structure into which a reciprocating slat conveyer may be incorporated is a trailer. Reciprocating slat conveyers are typically mounted on an existing trailer or other structure, rather than being manufactured together with the structure itself as an original part of the structure. Therefore, it is desirable for a conveyer to be relatively easy to mount onto a structure and have some flexibility in adjusting to variations in the dimensioning of the structure. Ease and flexibility in mounting is preferably accomplished while also achieving and/or maintaining compactness and strength in the drive assembly of the conveyer.

Drive frame assemblies for reciprocating slat conveyers are disclosed in my U.S. Pat. No. 4,712,467, granted Dec. 15, 1987; U.S. Pat. No. 4,748,893, and U.S. Pat. No. 4,748,894, both granted Jun. 7, 1988; and U.S. Pat. No. 4,821,868, granted Apr. 18, 1989. Each of these patents shows an assembly having opposite end frame members to which the opposite ends of drive units are secured. The use of ball blocks that receive the ball ends of drive units to mount the drive units onto drive frame members is illustrated in my U.S. Pat. No. 4,817,783, granted Apr. 4, 1989; U.S. Pat. No. 4,969,389, granted Nov. 13, 1990; U.S. Pat. No. 5,096,356, granted Mar. 17, 1992; U.S. Pat. No. 5,125, 502, granted Jun. 30, 1992; U.S. Pat. No. 5,165,524, granted Nov. 24, 1992; and U.S. Pat. No. 5,193,661, granted Mar. 16, 1993.

In my above-cited copending application Ser. No. 08/164, 895, of which this application is a continuation-in-part, a drive frame assembly having a transverse drive frame member with bendable outer end portions is disclosed. The transverse drive frame member has a central portion to which one or more drive units are connected and opposite side portions extending laterally outwardly from the central portion, each to an outer end portion. When the conveyor is mounted on a structure, the side portions of the transverse drive frame member are bent in position relative to the central portion to permit vertical adjustment of the outer ends of the side portions relative to the central portion.

SUMMARY OF THE INVENTION

A subject of the invention is a reciprocating slat conveyor comprising at least two sets of conveyor slats and a conveyor drive for moving the conveyor slats in a first direction, for conveying a load and for retracting the conveyor slats in the opposite direction. The conveyor drive includes a separate piston-cylinder drive unit for each set of conveyor slats. The drive units are positioned below the conveyor slats. Each drive unit includes a movable portion connected to its set of conveyor slats and a fixed portion including a mounting end part. A main frame is positioned below the conveyor slats. A transverse drive frame member is also positioned below the conveyor slats and is connected to the main frame. The transverse drive frame member includes a generally horizontal metal plate having a central portion and opposite side portions extending laterally outwardly from the central portion, each to an outer end. At each of the outer ends, a fastener secures the outer end to a portion of the main frame. A shim is positioned between the outer end and the portion of the main frame. The shims provide compensation for variations in vertical spacing of the drive units relative to said portions of the main frame.

The central portion of the metal plate is preferably strengthened. This may be accomplished by providing the central portion with a plurality of strengthening ribs extending longitudinally of the conveyor. In such an arrangement, the mounting end parts of the drive units are connected to the central portion and are placed in substantial axial alignment with the ribs on the central portion. The ribs may be formed in various ways and may have varying configurations. In the preferred embodiment, the ribs are provided by forming the metal plate to include a plurality of corrugations extending longitudinally of the conveyor generally in line with the drive units. The corrugations preferably include end portions confronting and connected to the mounting end parts of the drive units so that the corrugations carry axial drive forces generated by the drive units.

Another preferred feature of the invention is a transverse beam that extends laterally along and is firmly connected to a longitudinal edge portion of the metal plate, from one of the outer ends to the other of the outer ends, for stiffening the metal plate. In the preferred embodiment, two such transverse beams are provided, with the metal plate being positioned therebetween. Another preferred feature of the conveyor is providing the mounting end part of each drive unit in the form of a ball end and positioning the ball end in a cavity in a ball block. The ball block is firmly connected to the central portion of the metal plate to secure the drive unit to the transverse drive frame member. Each drive unit may have opposite ball ends that are connected to opposite transverse drive frame members by means of ball blocks.

Another subject of the invention is a method of mounting a reciprocating slat conveyor on a structure which has a main frame with laterally spaced apart portions. The method comprises providing a conveyor drive and a drive frame. The conveyor drive includes a piston-cylinder drive unit having a movable portion and a fixed portion with a mounting end part. The drive frame includes a transverse drive frame member having a metal plate with a central portion and opposite side portions extending laterally outwardly from the central portion, each to an outer end. The transverse drive frame member is stiffened to resist bending about a longitudinal axis. The mounting end part of the drive unit is connected to the central portion of the metal plate. The outer ends of the metal plate are positioned adjacent to the laterally spaced apart support portions of the main frame. A plurality of conveyor slats are positioned above the drive unit, the main frame, and the transverse drive frame member and are connected to the movable portion of the drive unit. The outer ends of the metal plate are secured to the spaced apart support portions by using a fastener to connect each outer end to one of the support portions and positioning a shim between the outer end and the support portion to compensate for variations in vertical spacing of the drive unit relative to the support portions.

Preferably, the drive frame includes two longitudinally spaced transverse drive frame members connected by a pair of laterally spaced longitudinal drive frame members. Each transverse drive frame member is stiffened. The drive unit has opposite mounting end parts each of which is connected to the central portion of the corresponding metal plate.

Also preferably, the central portion of the metal plate is provided with a plurality of strengthening ribs extending longitudinally of the conveyor. When the mounting end part of the drive unit is connected to the central portion, the drive unit is placed in substantial axial alignment with the ribs on the central portion. The preferred form of the ribs is corrugations, as described above.

Other preferred features of the method are providing the conveyor drive with a plurality of drive units, each connected in the manner described above, and stiffening the transverse drive frame member with one or more transverse beams connected to longitudinal edge portions of the metal plate from one of said outer ends to the other of said outer ends. Still another preferred feature is connecting each drive unit mounting end part by means of a ball end/ball block connection.

In the system of the invention, the various features result in ease and flexibility in mounting the conveyor drive assembly onto a structure, compactness and strength in the drive assembly, and simplicity of structure and ease of maintenance of the drive assembly. The stiffened transverse drive frame member provides a strong structure for reacting drive forces generated by the drive unit or units and transmitting these forces to the main frame. The feature of providing the connection between the transverse drive frame member and the main frame by means of fasteners and shims allows the connection to be made quickly and easily while still maintaining the structural strength of the drive frame assembly and the efficient transmission of forces to the main frame.

The preferred configuration of the drive assembly with the opposite transverse drive frame members connected by longitudinal drive frame members and the drive units mounted by means of ball blocks, helps to maximize the compactness and strength of the drive assembly and also the ease of installation and maintenance of the assembly. The assembly ay be preassembled and brought to an installation location and connected to the main frame of a structure without any need for on-location adjustment of the components of the drive assembly relative to each other. The connection of the transverse drive frame members to the main frame by means of fasteners and shims automatically compensates for variations in the vertical spacing of the drive units relative to the main frame.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 4 is a side elevational view of one end of the assembly shown in FIG. 1.

FIG. 5 is a sectional view taken along the line 5—5 in FIG. 3.

FIG. 6 is a partially schematic longitudinal sectional view of the drive frame assembly shown in FIGS. 1–5 and additional portions of the conveyor.

BEST MODE FOR CARRYING OUT THE INVENTION

Figure 7:
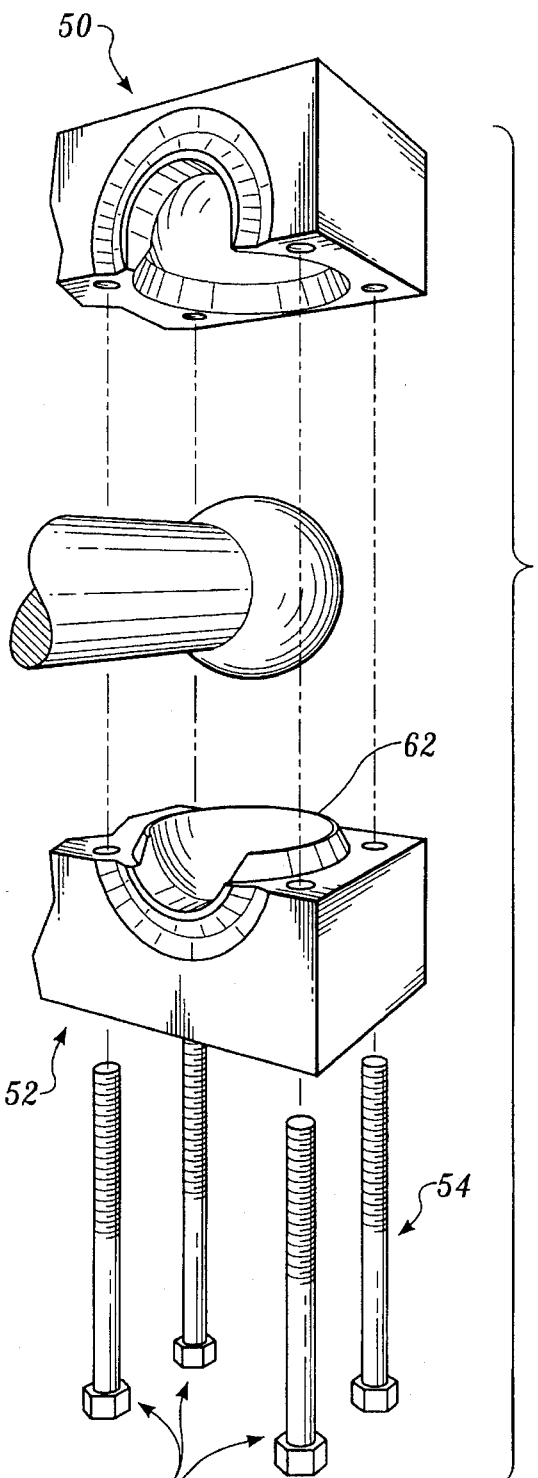
FIG. 7 is an exploded pictorial view of the preferred embodiment of the ball block and the ball end portion of one of the motors.
Figure 8:
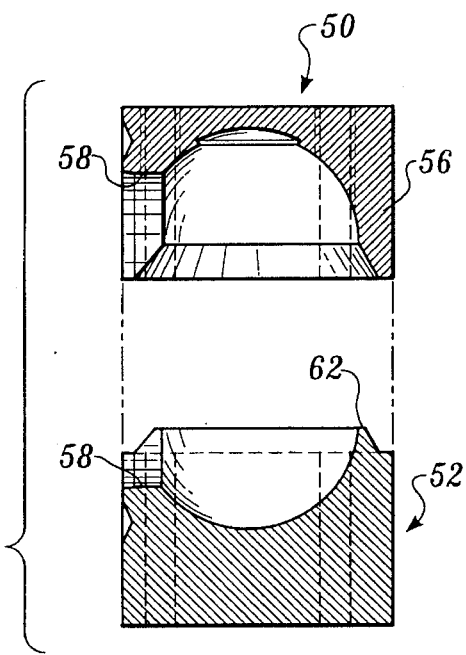
FIG. 8 is a sectional view of the upper and lower housing portions of the ball block shown in FIG. 7.

The drawings illustrate the preferred embodiment of the invention and the best mode for carrying out the invention currently known to the applicant. A major focus of the invention is the drive frame assembly, the preferred embodiment of which is shown in FIGS. 1–6. FIGS. 7 and 8 illustrate the preferred embodiment of the ball block of the drive assembly.

The invention encompasses a reciprocating slat conveyor comprising a plurality of conveyor slats 2. The conveyor slats 2 may take various forms. Since the details of the structure of the slats 2 are not a part of the present invention, the slats 2 are shown schematically in FIGS. 4 and 5. The slats are preferably provided in a plurality of sets, with the preferred number of sets being three.

The conveyor has a drive unit comprising a piston-cylinder hydraulic motor 10, 20 for each set of slats 2. In the preferred operation of the conveyor, the movable portions of all three motors 10, 20 are moved in a first direction in unison to convey a load. Then, the movable portions of the motors are moved in an opposite direction, one at a time, for returning the slats to a start position, one-third of the slats at a time. This operational sequence is known and is described in my U.S. Pat. No. 5,193,661, cited above.

The conveyor also includes a transverse drive beam 4 for each set of slats 2. See FIG. 6. In the conveyor illustrated in the drawings, there are three transverse drive beams 4 each of which is connected to its corresponding motor 10, 20 by clamps 6. Each transverse drive beam 4 is also connected to each slat 2 in its set of slats. Thus, the beam 4 transmits movement of the motor 10, 20 to movement of the slats 2. The details of the structure of the beams 4 and the manner of their connections to the slats 2 and the motors 10, 20 form no part of the present invention and may be varied considerably without departing from the spirit and scope of the invention. Preferably, the beams 4 are positioned close together above the motors 10, 20 and are connected to the motors 10, 20 in the manner shown in FIG. 6 and in my U.S. Pat. No. 4,821,868, cited above.

Referring to FIGS. 1–6, the drive frame assembly comprises a drive frame and a conveyor drive for moving the conveyor slats 2 as described above. The conveyor drive includes at least one drive unit and preferably includes three separate piston-cylinder drive units, one for each set of conveyor slats 2. The drive units can be seen in FIGS. 2, 3, and 6. Each drive unit comprises a hydraulic motor having a movable portion and a fixed portion. In the illustrated embodiment of the conveyor drive, the cylinder 10 of each motor is movable and is mounted on a fixed piston 20. In each motor, there are two separate piston heads 22, and the cylinder 10 is divided into two sections, to increase the effective pressure surface area of the motor while maintaining a relatively small motor diameter. This type of two-part motor is disclosed in my U.S. Pat. No. 4,748,893, cited above.

The details of one of the motors 10, 20 are shown partially schematically in FIG. 6. Each half of the motor 10, 20 includes a piston rod 21 having at its opposite ends a piston head 22 and a ball end 24, 26. Each ball end 24, 26 is mounted onto the drive frame by means of a ball block 50, 52, as described further below. The piston heads 22 are received into their respective halves of the cylinder 10. The two portions of the cylinder 10 are separated by a divider wall 14. In each half of the cylinder 10, there is a first chamber 36 and a second annular chamber 38. The first chamber 36 of each half of the cylinder is connected by a conduit 16, 18 to the second annular chamber 38 of the other half of the cylinder. This achieves the desired increase in the effective pressure surface area of the motor and also produces equal pressure surfaces for movement of the cylinder in both directions. The piston rod 21 extends from the ball end 24, 26 into the cylinder. The end of the cylinder through which the rod 21 extends is closed by a cylinder head 12.

One of the ball ends 24 is provided with a plurality of passageways for delivering hydraulic pressure to and returning hydraulic pressure from the motor 10, 20. These passageways are shown schematically in FIG. 6. The other ball end 26 is a closed blind end. The active ball end 24 has a first passageway 28 which communicates with the first chamber 36 of the corresponding cylinder portion and, via conduit 18, with the annular chamber 38 in the other half of the cylinder. Hydraulic pressure introduced into passageway 28 causes the cylinder to move to the left (as shown in FIG. 6). The ball end 24 has a second passageway 30 which communicates with the annular chamber 38 of its corresponding cylinder section and, via conduit 16, with the chamber 36 in the other cylinder section. Hydraulic pressure introduced into the passageway 30 causes the cylinder 10 to move to the right (as shown in FIG. 6). The motor 10, 20 is preferably provided with an internal check valve 32 and associated passageway 34 of the type disclosed in my U.S. Pat. No. 5,325,763. The description of the internal check valve in that patent is incorporated herein by reference.

The drive system shown in FIG. 6 also includes a check valve 44 of the type disclosed and claimed in my U.S. Pat. No. 5,255,712. The valve 44 has a wire cable or rod 46 extending therefrom and terminating in an abutment 48. Movement of the cylinder 10 all the way to the left (as shown) causes an abutment on the cylinder, for example a portion of the clamp 6, to contact the abutment 48 to open the check valve 44. The drive system also includes a number of additional valves and controls that are housed in a manifold 94, shown in FIG. 6. Valve 44 and the components housed in manifold 94 do not form a part of the present invention. An example of a suitable combination of additional drive system elements is disclosed in my U.S. Pat. No. 5,193,661.

The piston-cylinder drive units are mounted on the drive frame of the drive frame assembly. The drive frame includes, at each of its opposite ends, a transverse drive frame member 64. The transverse drive frame members 64 are connected together by a pair of laterally spaced, longitudinally extending beams 90. These beams 90 may, for example, be formed by square tubing. Each transverse member 64 comprises a generally horizontal metal plate 66 having a central portion and opposite side portions 74 projecting laterally outwardly from the central portion. The side portions 74 terminate in outer ends 76.

The transverse drive frame member 64 is stiffened to resist bending and to enable it to carry axial drive forces. The central portion is preferably provided with a plurality of strengthening ribs extending longitudinally of the conveyor into which the assembly is incorporated. In the preferred embodiment shown in the drawings, the ribs are formed by a plurality of corrugations 68 formed in the central portion of the metal plate 66. The bending resistance is provided primarily by the inclusion in the drive frame member 64 of two longitudinally spaced apart transverse beams 78, 80 and by the ball blocks 50, 52. A first transverse beam 78 extends laterally along the outer longitudinal edge 79 of the metal plate 66. It is secured to the longitudinal edge 79, including the corrugations 68, from one outer end 76 to the other outer end 76 of the side portions 74 of the metal plate 66, by suitable means, such as welding W. This beam 78 has a rectangular cross section. The other transverse beam 80 has an L-shaped cross section and extends laterally along the inner longitudinal edge 81 of the plate 66. The beam 80 has a horizontal leg 88 and a vertical leg 82. The vertical leg 82 is secured, such as by welding W, to he edge 81 in the same manner that the beam 78 is secured to edge 79 except that the major portion of the connection to the corrugations 68 is made via the ball blocks 50, 52. The two beams 78, 80 and the ball blocks 50, 52 provide the transverse drive frame member 64 with resistance to bending about a longitudinal axis. The longitudinal beams 90 that interconnect the two transverse drive frame members 64 are also welded to the vertical leg 82.

Figure 1:
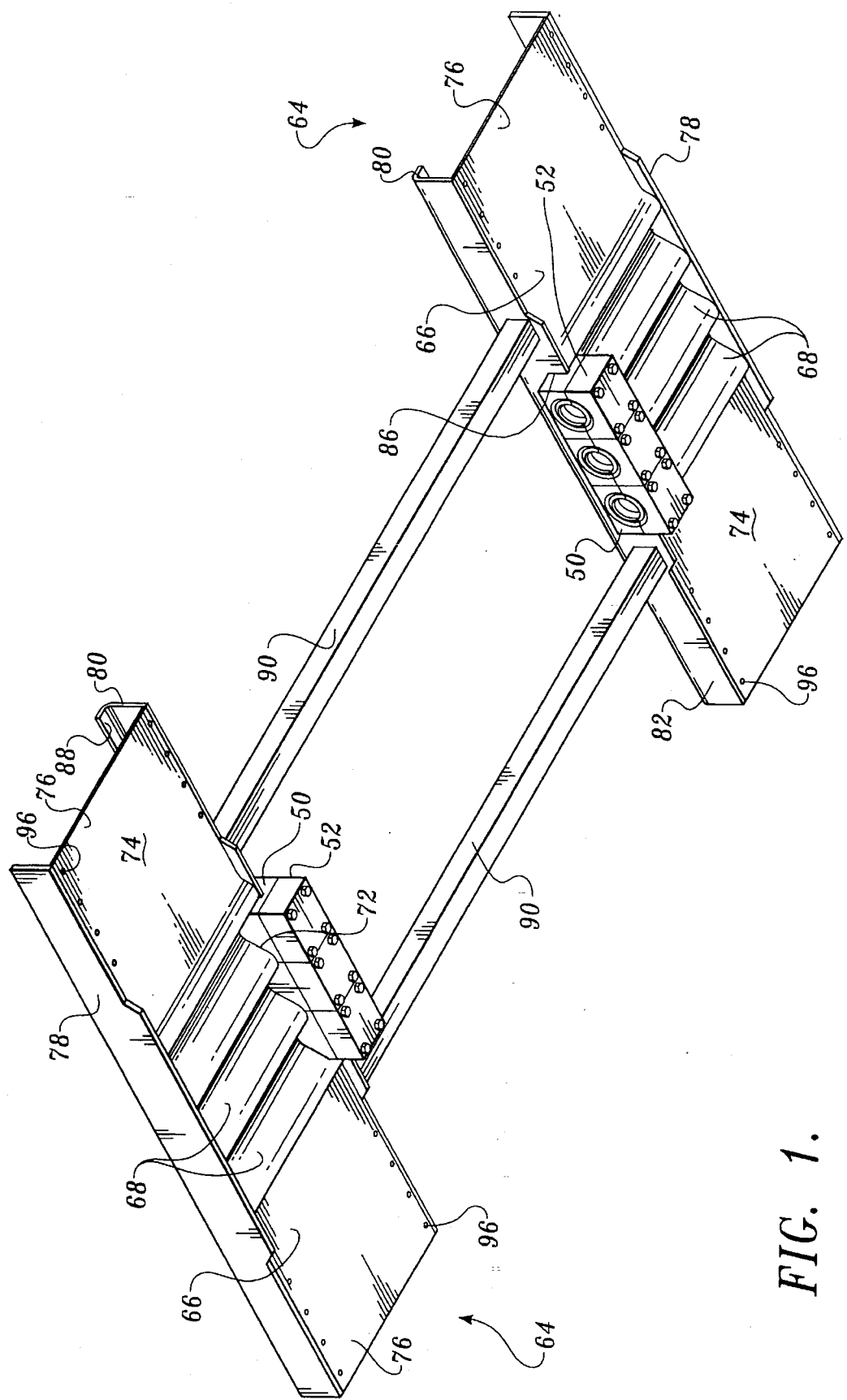
FIG. 1 is a pictorial view looking up at the preferred embodiment of the drive frame assembly of the invention, excluding the linear reciprocating motors thereof.

As can be seen in FIGS. 1, 4, and 5, the edges of the portions of the beams 78, 80 that are secured to the opposite side portions 74 of the metal plate 66 are flush with the plane of the lower surface of the side portions 74 in the assembled drive frame. This arrangement prevents the beams 78, 80 from interfering with the attaching of the metal plate 66 to the main frame of a structure, as described below. The central portions of the beams 78, 80 have an increased width so that they extend downwardly below this plane in the assembled drive frame. The increased width allows the beam 78, 80 to be secured to the entire longitudinal edge 79, 81 of the metal plate 66, including the central corrugated portion of the edge 79, 81, which extends above and below the plane.

The inner longitudinal edge portion of the central portion of the metal plate 66 is provided with a cut-out 70. The central portion of the vertical leg 82 of the beam 80 has a corresponding cut-out 86. The cut-outs 70, 86 in the metal plate 66 and the beam leg 82 are aligned and provide a recess for receiving a set of three ball blocks 50, 52. The three ball blocks 50, 52 are welded together and to the inner end portions 72 of the corrugations 68 that confront the drive units and form the inner edge of the recess. This provides a secure mounting of the respective drive unit ends to the transverse drive frame members 64. Along the inner edge of each transverse drive frame member 64, the L-shaped beam 80 and the ball blocks 50, 52 cooperate to provide the desired stiffening. In effect, the two components 50, 52 and 80 together form a transverse beam.

Each ball block 50, 52 preferably has essentially the same configuration as the ball block disclosed in my U.S. Pat. No. 5,350,054. The portions of such patent describing the ball block are incorporated herein by reference. Since the details of the structure of the ball block do not form a part of the present invention, the ball block will only be briefly described herein.

Referring to FIGS. 6–8, each ball block 50, 52 includes an upper housing portion 50 and a lower housing portion 52. Unlike the ball block shown in my U.S. Pat. No. 5,350,054, the ball block in the conveyor drive of the invention preferably has the overall square housing configuration shown in the drawings herein. The two housing portions are secured together by means of fasteners 54. The upper housing portion 50 has an outer wall 56 which is secured to the confronting end portions 72 of the corrugations 68, as shown in FIGS. 1 and 3–6. The axis of each drive unit extends through the outer wall 56 and is aligned with the corrugations 68 to efficiently transmit loads to the transverse drive frame member 64 and relieve loads on the fasteners 54, as described in detail in my U.S. Pat. No. 5,350,054. The corrugations 68 carry axial drive forces generated by the drive units 10, 20 and transmit the forces to the underlying structure via the outer ends 76 of the plate 66.

The corresponding ball end 24, 26 is received into a cavity formed by each ball block 50, 52. The piston rod 21 extends from the ball end 24, 26 out of the ball block housing 50, 52 through a passageway 58. A seal (not shown) surrounds the rod 21. Preferably, a flange 62 extends upwardly from the lower housing portion 52. The flange 62 cooperates with the outer wall 56 to form the socket into which the ball end 24, 26 is received. On one end of the frame, each lower housing portion 52 includes a plurality of passageways for delivering fluid pressure to, and returning fluid pressure from, the ball end 24 received in the ball block 50, 52. The passageways communicate with passageways 28, 30, 34 in the ball end 24.

Figure 3:
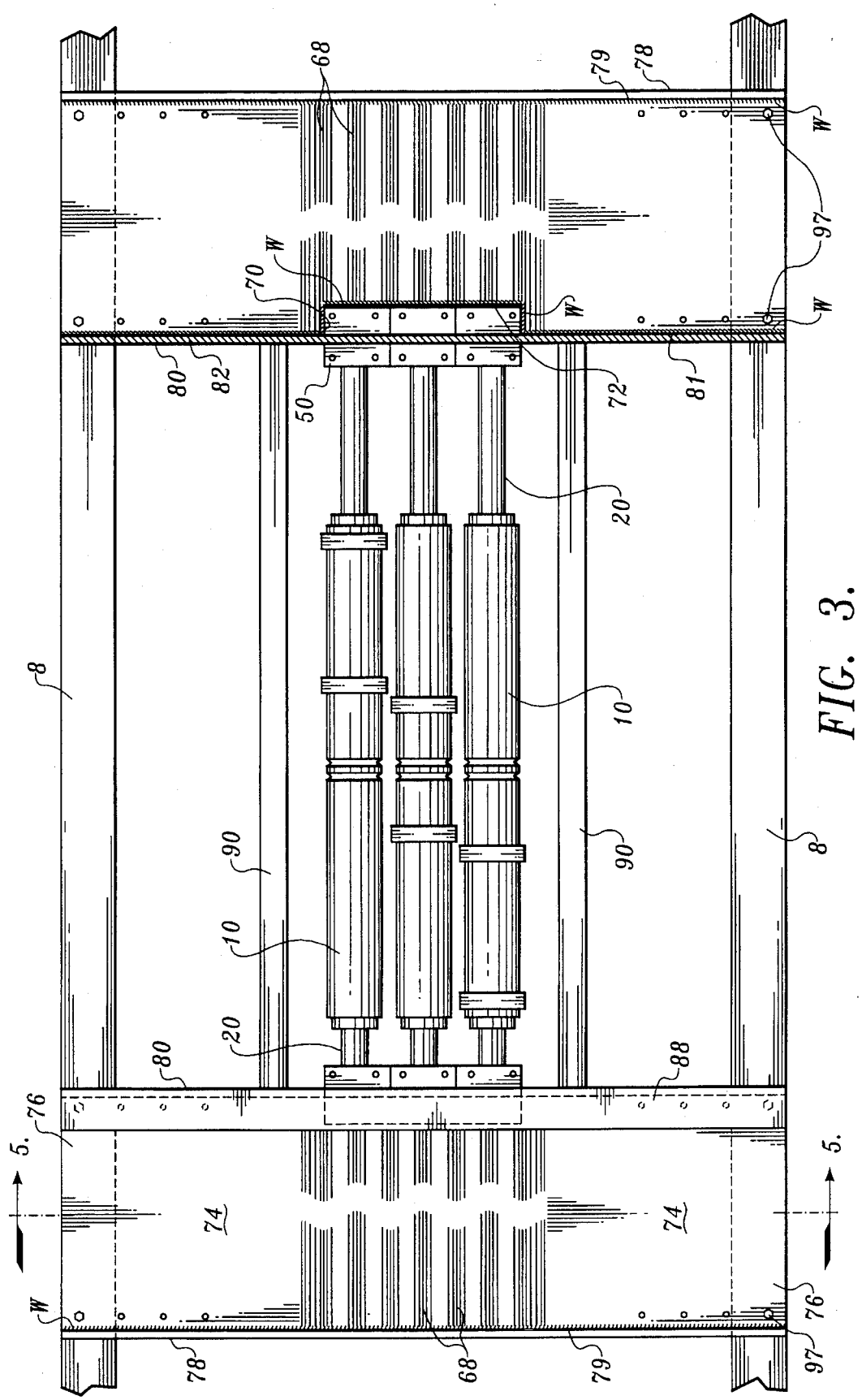
FIG. 3 is a top plan view of the assembly shown in FIGS. 1 and 2, with the clamps that connect the motors to the transverse drive beams added.

The present invention encompasses a method of mounting a reciprocating slat conveyor on a structure as well as the conveyor itself and the drive frame assembly thereof. In the method, the drive frame assembly of the conveyor is mounted by attaching it to laterally spaced apart portions of a main frame of the structure. The method is preferably practiced using the preferred embodiment of the drive frame assembly shown in the drawings and described above. The metal plate 66 is stiffened as described above, and the mounting end parts, i.e. the ball blocks 50, 52, of the drive units are secured to the central portion. The drive frame assembly is positioned on the structure with the outer ends 76 of the metal plate side portions 74 positioned over the laterally spaced apart portions of the main frame. As shown in FIGS. 3 and 5, these laterally spaced portions are upper portions of the upper flanges of two I-beams 8.

Figure 2:
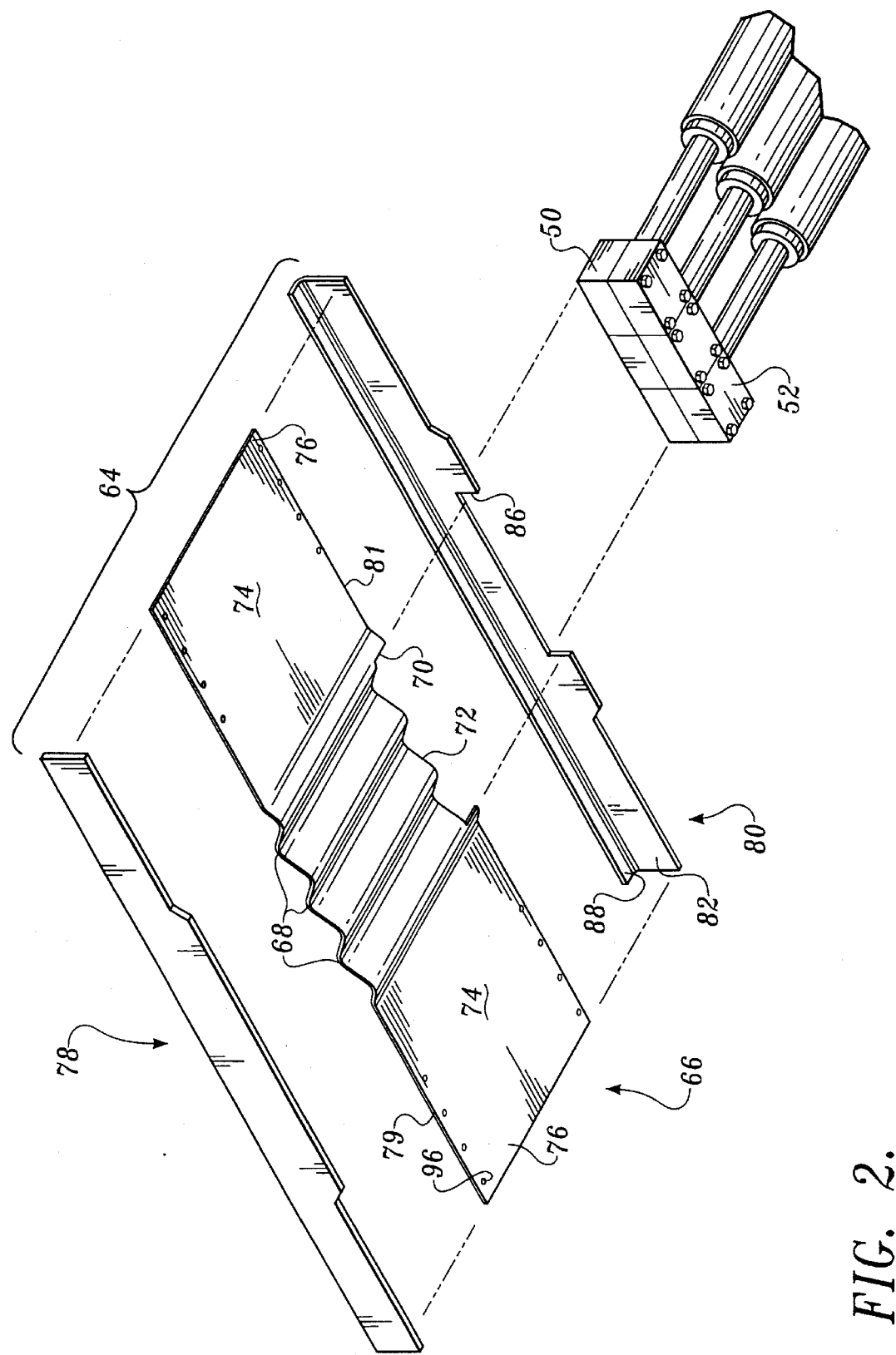
FIG. 2 is an exploded pictorial view of one end of the assembly shown in FIG. 1 but including the motors.

When the assembly is mounted onto an existing structure, there commonly is some variation in the vertical spacing of the drive units relative to the upper flanges of the I-beams 8. Since the outer ends 76 of the opposite side portions 74 of each metal plate 66 must be secured to the upper flanges of the I-beams 8 to secure the drive frame assembly to the structure, and since the drive frame assembly, and in particular each transverse drive frame member 64, is a substantially rigid structure, there is a need to compensate for the variation in vertical spacing. In accordance with the present invention, shims are used to provide the necessary compensation. At least one fastener 97 is extended through a fastener hole 96 in each outer end 76 of the metal plate 66 and a corresponding hole in the flange of the I-beam 8 to connect the outer end 76 of the plate 66 to the flange. As shown in FIGS. 1–3, each outer end 76 of the plate 66 is provided with two rows of fastener hoes 96 along its inner and outer longitudinal edge portions. Ordinarily, the outermost hole 96 in each row is used to provide the desired connection. After each fastener 97 has been positioned to provide the connection, a shim 98 is moved into position between the outer end 76 and the I-beam flange. Then, the fastener 97 is fully tightened to provide a firm connection. In the completed connection, the shims 98 may be held in position simply by friction, or the frictional engagement may be strengthened by means such as welding. The four fasteners 97 and the associated shims 98 firmly secure the plate 66 to the I-beams 8 and level the plate 66 in a horizontal position.

As shown in FIG. 5, the fastener 97 is provided in the form of a bolt and nut, and the shim 98 has a tapered edge to assist in its positioning. The type of fastener, shim configuration, and order in which the fastener and shims are put into position may be varied. Whatever form these elements of the invention take, the fastener/shim arrangement provides a simple and cost effective means for mounting a preassembled drive frame assembly onto a structure and automatically compensating for variations in vertical spacing.

The method of mounting the conveyor also includes positioning the conveyor slats 2 above the drive units, the main frame, and the transverse drive frame members 64. Each set of conveyor slats 2 is connected to the movable cylinder portion 10 of its corresponding drive unit. As illustrated, this is accomplished by engaging the cylinder 10 with a pair of clamps 6 that are secured to a transverse drive beam 4. The slats 2 in the set are then, in turn, positioned above the transverse drive beam 4 and secured thereto. The positioning and connecting of the slats 2 may be carried out before or after the fastener/shim connections of the drive frame assembly to the main frame are made. Once the conveyor has been installed, movement of the conveyor slats 2 during operation of the conveyor may be guided and supported by various known types of guide beams and bearings.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A reciprocating slat conveyor, comprising:

at least two sets of conveyor slats;

a conveyor drive for moving the conveyor slats in a first direction, for conveying a load, and for retracting the conveyor slats in the opposite direction; said conveyor drive including a separate piston-cylinder drive unit for each set of conveyor slats; said drive units being positioned below the conveyor slats; and each said drive unit including a movable portion connected to its set of conveyor slats and a fixed portion including a mounting end part;

a main frame below the conveyor slats;

a transverse drive frame member below the conveyor slats, connected to the main frame; said frame member including a generally horizontal metal plate formed to include a plurality of corrugations extending longitudinally of the conveyor generally in line with the drive units, said corrugations being connected to the mounting end parts of the drive units so that said corrugations carry axial drive forces generated by the drive units; and said metal plate including opposite side portions projecting laterally outwardly from the corrugations, each said side portion including an outer end; and at each said outer end, a fastener securing said outer end to a portion of the main frame, and a shim positioned between said outer end and said portion of the main frame; said shims providing compensation for variations in vertical spacing of the drive units relative to said portions of the main frame.

2. A reciprocating slat conveyor according to claim 1, wherein the transverse drive frame member includes a transverse beam extending laterally along at least one longitudinal edge portion of the metal plate, said beam being firmly connected to said edge portion, from one of said outer ends to the other of said outer ends, for stiffening the metal plate.

3. A reciprocating slat conveyor according to claim 1, wherein the transverse drive frame member includes a pair of longitudinally spaced apart transverse beams, wherein the metal plate is positioned longitudinally between the two transverse beams, and wherein opposite edge portions of the metal plate are firmly connected to the transverse beams, from one of said outer ends to the other of said outer ends, to stiffen the metal plate.

4. A reciprocating slat conveyor according to claim 1, in which said mounting end part of each drive unit comprises a ball end, and which comprises a ball block for each drive unit, each said ball block defining a cavity into which said ball end of the corresponding drive unit is received, and each said ball block confronting and being firmly connected to end portions of the corrugations to secure the drive unit to the transverse drive frame member.

5. A reciprocating slat conveyor according to claim 4, wherein said fixed portion of each drive unit has opposite ends comprising said ball end and a second ball end, respectively; and said conveyor comprises a second said transverse drive frame member, and a second ball block corresponding to each said second ball end; said second ball block defining a cavity into which the corresponding second ball end is received, and confronting and being firmly connected to end portions of the corrugations of the second transverse drive frame member to secure the drive unit thereto.

6. A reciprocating slat conveyor according to claim 2, in which said mounting end part of each drive unit comprises a ball end, and which comprises a ball block for each drive unit, each said ball block defining a cavity into which said ball end of the corresponding drive unit is received, and each said ball block confronting and being firmly connected to end portions of the corrugations to secure the drive unit to the transverse drive frame member.

7. A reciprocating slat conveyor, comprising:

at least two sets of conveyor slats;

a conveyor drive for moving the conveyor slats in a first direction, for conveying a load, and for retracting the conveyor slats in the opposition direction; said conveyor drive including a separate piston-cylinder drive unit for each set of conveyor slats; said drive units being positioned below the conveyor slats; and each said drive unit including a movable portion connected to its set of conveyor slats and a fixed portion having a mounting end part;

a main frame below the conveyor slats;

a transverse drive frame member below the conveyor slats, connected to the main frame; said frame member including a generally horizontal metal plate having a central portion provided with a plurality of strengthening ribs extending longitudinally of the conveyor, and opposite side portions extending laterally outwardly from the central portion, each to an outer end; and at each said outer end, a fastener securing said outer end to a portion of the main frame, and a shim positioned between said outer end and said portion of the main frame; said shims providing compensation for variations in vertical spacing of the drive units relative to said portions of the main frame;

wherein said mounting end parts of the drive units are connected to the central portion of the metal plate, to place the drive units in substantial axial alignment with the ribs on the central portion of the metal plate.

8. A reciprocating slat conveyor according to claim 7, wherein the transverse drive frame member includes a transverse beam extending laterally along at least one longitudinal edge portion of the metal plate, said beam being firmly connected to said edge portion, from one of said outer ends to the other of said outer ends, to stiffen the metal plate.

9. A reciprocating slat conveyor according to claim 7, wherein the transverse drive frame member includes a pair of longitudinally spaced apart transverse beams, the metal plate is positioned longitudinally between the two transverse beams, and opposite edge portions of the metal plate are firmly connected to the transverse beams from one of said outer ends to the other of said outer ends, to stiffen the metal plate.

10. A reciprocating slat conveyor according to claim 7, in which said mounting end part of each drive unit comprises a ball end, and which comprises a ball block for each drive unit, each said ball block defining a cavity into which said ball end of the corresponding drive unit is received, and each said ball block being firmly connected to said central portion of the metal plate to secure the drive unit to the transverse drive frame member.

11. A reciprocating slat conveyor according to claim 10, wherein said fixed portion of each drive unit has opposite ends comprising said ball end and a second ball end, respectively; and said conveyor comprises a second said transverse drive frame member, and a second ball block corresponding to each said second ball end; said second ball block defining a cavity into which the corresponding second ball end is received and being firmly connected to said central portion of the metal plate of the second transverse drive frame member to secure the drive unit thereto.

12. A method of mounting a reciprocating slat conveyor on a structure, said structure including a main frame having laterally spaced apart support portions, comprising:

providing a conveyor drive including a piston-cylinder drive unit having a movable portion and a fixed portion with a mounting end part;

providing a drive frame including a transverse drive frame member having a metal plate with a central portion and opposite side portions extending laterally outwardly from said central portion, each to an outer end;

stiffening said transverse drive frame member, including stiffening the metal plate to resist bending about a longitudinal axis and providing the central portion of the metal plate with a plurality of strengthening ribs extending longitudinally of the conveyor;

connecting the mounting end part of the drive unit to said central portion, including placing the drive unit in substantial axial alignment with the ribs on the central portion;

positioning said outer ends of said side portions of the metal plate adjacent to said laterally spaced apart support portions of the main frame;

providing a plurality of conveyor slats, and positioning the slats above the drive unit, the main frame, and the transverse drive frame member;

connecting the conveyor slats to the movable portion of the drive unit; and securing said outer ends to said spaced apart support portions, including using a fastener to connect each said outer end to one of said support portions and positioning a shim between said outer end and said support portion to compensate for variations in vertical spacing of the drive unit relative to said support portions.

13. The method of claim 12, in which the conveyor drive includes a plurality of piston-cylinder drive units, each having a movable portion and a fixed portion with a mounting end part; and which comprises connecting the mounting end part of each drive unit to said central portion of the metal plate, placing each drive unit in substantial axial alignment with the ribs on said central portion, providing a plurality of sets of conveyor slats, one set for each drive unit, positioning said sets of slats above said drive units, the main frame, and the transverse drive frame member, and connecting each set of slats to the movable portion of its drive unit.

14. The method of claim 13, in which the step of stiffening said transverse drive frame member includes firmly connecting a transverse beam to a longitudinal edge portion of the metal plate and extending the connection along said longitudinal edge portion from one of said outer ends to the other of said outer ends, to stiffen the metal plate to resist bending about a longitudinal axis.

15. The method of claim 13, in which the step of stiffening said transverse drive frame member includes positioning the metal plate longitudinally between two transverse beams and firmly connecting opposite edge portions of the metal plate to the transverse beams, from one of said outer ends to the other of said outer ends, to stiffen the metal plate to resist bending about a longitudinal axis.

16. The method of claim 15, in which the drive frame includes two of said transverse drive frame members positioned opposite each other, and the fixed portion of each drive unit has opposite mounting end parts; and which comprises stiffening each said transverse drive frame member, including stiffening the metal plate to resist bending about a longitudinal axis and providing the central portion of the metal plate with a plurality of strengthening ribs extending longitudinally of the conveyor, connecting the opposite mounting end parts of each of the drive units to said central portions of the metal plates of the opposite transverse drive frame members, respectively, including placing the drive unit in substantial axial alignment with the ribs on each of said central portions, positioning said outer ends of said side portions of each of the metal plates adjacent to laterally spaced apart support portions of the main frame, and securing said outer ends of each of the metal plates to said spaced apart support portions, including using a fastener to connect each said outer end to one of said support portions and positioning a shim between said outer end and said support portion to compensate for variations in vertical spacing of the drive units relative to said support portions.

17. The method of claim 13, in which the drive frame includes two of said transverse drive frame members positioned opposite each other, and the fixed portion of each drive unit has opposite mounting end parts; and which comprises stiffening each said transverse drive frame member, including stiffening the metal plate to resist bending about a longitudinal axis and providing the central portion of the metal plate with a plurality of strengthening ribs extending longitudinally of the conveyor, connecting the opposite mounting end parts of each of the drive units to said central portions of the metal plates of the opposite transverse drive frame members, respectively, including placing the drive unit in substantial axial alignment with the ribs on each of said central portions, positioning said outer ends of said side portions of each of the metal plates adjacent to laterally spaced apart support portions of the main frame, and securing said outer ends of each of the metal plates to said spaced apart support portions, including using a fastener to connect each said outer end to one of said support portions and positioning a shim between said outer end and said support portion to compensate for variations in vertical spacing of the drive units relative to said support portions.

18. The method of claim 13, in which the step of stiffening said transverse drive frame member includes providing said plurality of strengthening ribs by providing said transverse drive frame member with a plurality of corrugations extending longitudinally of the conveyor generally in line with the drive units, and which comprises connecting the mounting end parts of the drive units to confronting end portions of the corrugations so that the corrugations carry axial drive forces generated by the drive units.

19. A method of mounting a reciprocating slat conveyor on a structure, said structure including a main frame having laterally spaced apart support portions, comprising:

providing a conveyor drive including a piston-cylinder drive unit having a movable portion and a fixed portion with opposite mounting end parts;

providing a drive frame including first and second longitudinally spaced transverse drive frame members each having a metal plate with a central portion and opposite side portions extending laterally outwardly from said central portion, each to an outer end, and a pair of laterally spaced longitudinal drive frame members extending between and connecting said transverse drive frame members;

stiffening each said transverse drive frame member to resist bending about a longitudinal axis;

connecting the mounting end parts of the drive unit to said central portions of said metal plates;

positioning said outer ends of each said metal plate adjacent to said laterally spaced apart support portions of the main frame;

providing a plurality of conveyor slats, and positioning the slats above the drive unit, the main frame, and the drive frame;

connecting the conveyor slats to the movable portion of the drive unit; and securing said outer ends of each said metal plate to said spaced apart support portions, including using a fastener to connect each said outer end to one of said support portions and positioning a shim between said outer end and said support portion to compensate for variations in vertical spacing of the drive unit relative to said support portions.

20. The method of claim 19, in which the conveyor drive includes a plurality of piston-cylinder drive units, each having a movable portion and a fixed portion with opposite mounting end parts; and which comprises connecting the mounting end parts of each drive unit to said central portions of said metal plates, providing a plurality of sets of conveyor slats, one set for each drive unit, positioning said sets of slats above said drive units, the main frame, and the drive frame, and connecting each set of slats to the movable portion of its drive unit.

21. The method of claim 20, in which the step of stiffening each said transverse drive frame member includes firmly connecting a transverse beam to a longitudinal edge portion of the metal plate and extending the connection along said longitudinal edge portion from one of said outer ends to the other of said outer ends, to stiffen the metal plate to resist bending about a longitudinal axis.

22. The method of claim 20, in which the step of stiffening each said transverse drive frame member includes positioning the metal plate longitudinally between two transverse beams and firmly connecting opposite edge portions of the metal plate to the transverse beams, from one of said outer ends to the other of said outer ends, to stiffen the metal plate to resist bending about a longitudinal axis.

23. The method of claim 19, in which each said mounting end part comprises a ball end; and which comprises providing a ball block for each said ball end, and connecting each said mounting end part to one of said central portions by positioning said ball end in a cavity defined by the corresponding ball block and firmly connecting said ball block to said central portion.

24. The method of claim 20, in which each said mounting end part comprises a ball end; and which comprises providing a ball block for each said ball end, and connecting each said mounting end part to one of said central portions by positioning said ball end in a cavity defined by the corresponding ball block and firmly connecting said ball block to said central portion.

* * * * *

UNITED STATES PATENT AND TRADEMARK OFFICE
CERTIFICATE OF CORRECTION

PATENT NO. : 5,489,018
DATED : February 6, 1996
INVENTOR(S) : Raymond K. Foster

It is certified that error appears in the above-indentified patent and that said Letters Patent is hereby corrected as shown below:

On the title page, [54], In the title, "Stem" should be -- System --.

On the title page, [63], "No. 5,340,781" should be -- No. 5,390,781 --.

Column 1, line 7, "s a continuation-in-part U.S." should be
    -- is a continuation-in-part of U.S. --.

Column 1, line 9, "or" should be -- for --.

Column 3, line 53, "ay" should be -- may --.

Column 6, line 30, "he" should be -- the --.

Signed and Sealed this

Seventeenth Day of September, 1996

Attest:

BRUCE LEHMAN

Attesting Officer            Commissioner of Patents and Trademarks